Jan. 5, 1960   W. ULLMANN ET AL   2,920,180
ELECTROEROSIVE GRINDING METHOD AND
DEVICE FOR ITS PERFORMANCE
Filed March 17, 1958   6 Sheets-Sheet 1

INVENTORS:
Werner Ullmann
and
Willibald Ehrlich
By
Patent Agent

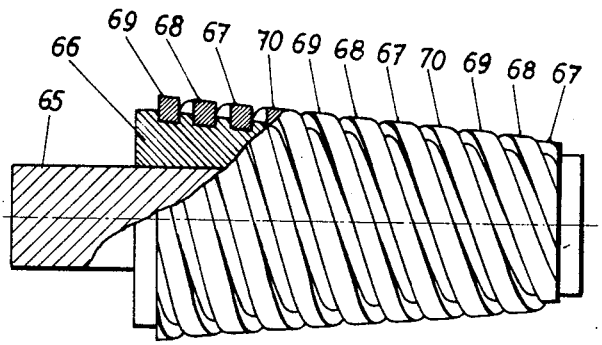
Fig. 8
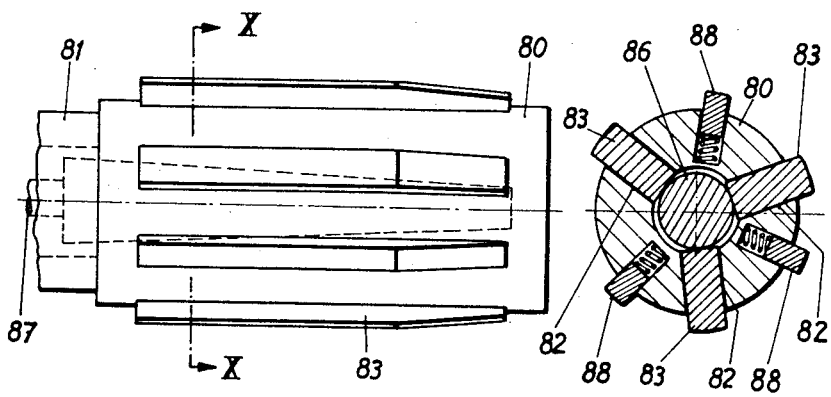
Fig. 9
Fig. 10

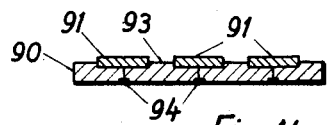
Fig. 14    Fig. 16
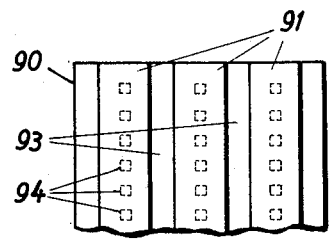
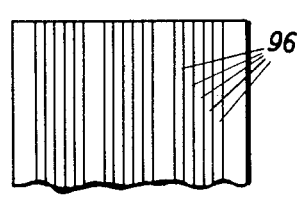
Fig. 15    Fig. 17
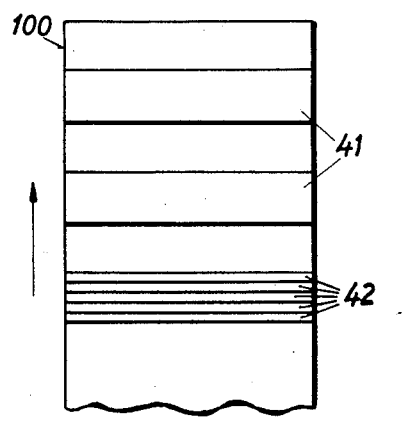
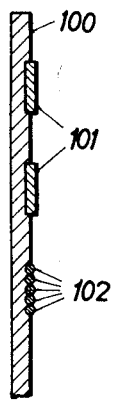
Fig. 18    Fig. 19

United States Patent Office 2,920,180
Patented Jan. 5, 1960

2,920,180
ELECTROEROSIVE GRINDING METHOD AND DEVICE FOR ITS PERFORMANCE

Werner Ullmann, Locarno-Monti, and Willibald Ehrlich, Losone-Locarno, Switzerland, assignors to Agie, A.G. fur industrielle Elektronek, Losone-Locarno, Switzerland, a company of Switzerland Application March 17, 1958, Serial No. 721,720

Claims priority, application Switzerland March 18, 1957

12 Claims. (Cl. 219—69)

The present invention relates to electro-erosive grinding and, more particularly, to an electro-erosive electrode.

In the erosive grinding processes so far used, a flat electrode has, by way of example, been employed for grinding a flat surface. It has been shown here that the surface finish depends, apart from the current path and the frequency, mainly on the maximum current flowing through the electrode. It was therefore necessary to limit this current independently of the size of an electrode. Accordingly, the process involved the disadvantage that the duration of treatment designed to obtain a certain surface finish was disproportionately long since the maximum current limit also considerably reduced the total power supplied. This disadvantage has jeopardized the economy of erosive grinding as such.

Tests have revealed that the necessary limitation of the current is required for the following reason: if any point projects above the surface to be treated, the resistance between that point and the electrode is so low that practically all available current flows through this point until the projecting point—as e.g. a projecting chip—is removed. If the total current so concentrated upon one point is very high, not only the chip itself will be removed but adjacent material portions as well, so that a crater is produced. The fineness of the surface is thereby greatly affected.

In practice this limitation of the power is achieved by providing an internal resistance in the current source, which is so dimensioned that the maximum current determined is not exceeded even in the case of short-circuits.

This short-circuit current being independent of the size of the electrode as stated, so far only minor currents could be used, which substantially increased the period of treatment at a given total power.

The present invention now has for its object to provide a method and device by means of which the power supplied to an electrode can be greatly increased without detrimentally affecting the surface of the work at the same time. Machining times can thus be substantially reduced.

It is also an object of this invention to provide an electrode which will make it possible to produce and machine surfaces and cavities or recesses of any desired shape while the electrode is characterized by a high electro-erosive grinding ability without affecting the surface quality of the work piece.

The present invention thus relates to an electroerosive grinding method which enables the machining time to be greatly reduced without detrimentally affecting the surface finish, and which is characterized by the fact that an aggregate electrode comprising at least two part electrodes insulated in respect of one another is moved relative to the work, the maximum current flowing through the part electrodes being individually limited.

The device according to the invention is characterized by an electrode subdivided into several sections which are insulated relatively to one another, and which are inclined relative to the direction of movement of the surface of the electrode.

A number of embodiments are exemplified in the attached drawing in which:

Fig. 8 is a conical electrode with helical electrode sections;

Figs. 9 and 10 are a side view and cross-section respectively of a cylindrical electrode for grinding bores;

Figs. 14 and 15 show a grinding band for the individual treatment of adjacent work surfaces with prismatic electrodes;

Figs. 16 and 17 are a side view and plan view respectively of a grinding band similar to that represented in Figs. 14 and 15 but having separate groups of wires for electrodes;

Figs. 18 and 19 are a side view and plan view respectively of a grinding band with electrode members disposed across the direction of the band;

Figure 1:
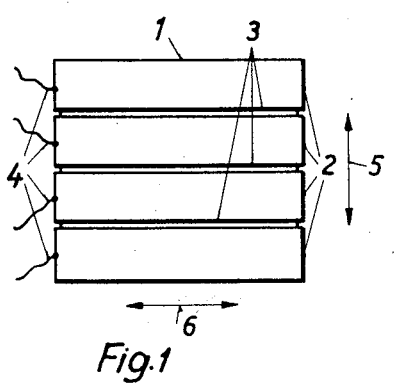
Fig. 1 shows a flat electrode.

Fig. 1 shows a tool designed for electroerosive grinding in which a flat electrode 1 is subdivided into four electrode sections 2 insulated in respect of one another by means of strips 3. The electrode body is preferably formed of an insulating material, such as synthetic resin, in which the electrode sections are embedded in insulated relationship. Connected to each electrode section is a flexible power supply cable as indicated diagrammatically at 4. The electrode is attached to a tool holder (not shown) which may cause it to perform an oscillating reciprocating movement, by way of example in the direction of arrow 5.

If a surface is to be ground or polished as evenly as possible, the tool will perform a movement in the direction of arrow 5. This enables such areas of the work surface to be treated which would be located opposite the insulating spaces 3 between the electrode sections 2 if the tool were stationary.

Each electrode section 2 possesses its own power supply line 4 which is so connected to a voltage source that the maximum current developing at each electrode section will not exceed a given limit value. This is obtained by connecting each electrode section to a common generator via resistances which may be adjusted if necessary. If a very low resistance, i.e. a short circuit, occurs between an electrode and a corresponding work portion, the total current then flowing will be limited by the corresponding resistance so that the surface defects cited in the introduction will not occur. This maximum admissible current being, however, independent of the electrode size, the electrode described enables four times the total current relative to a single continuous electrode to be applied without detrimentally affecting the surface to be treated. Accordingly, machining times are reduced to one quarter.

Furthermore it is also possible to treat the various areas of the work differently by means of the electrode disclosed. If the tool oscillates in the direction of arrow 6 while different voltages are applied to the individual electrodes, the sections of the work surface corresponding to the said electrode sections will obtain a different finish.

Figure 2:
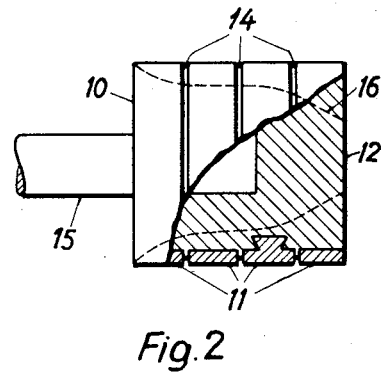
Fig. 2 shows a rotary electrode subdivided normally to its axis.

The electrode 10 diagrammatically shown in Fig. 2 is cylindrical, the individual electrode sections 11 are annular, arranged on the outer wall of the cylinder and also insulated with respect to one another. The complete tool, i.e. electrode 10, may be formed of a body 12 made of synthetic resin in which the annular electrodes 11 may be held by projections 14 and inserted. The driving shaft 15 may be cast integral with the tool. Each ring 11 is provided with its own electrical connection (not shown), e.g. a collecting ring and brush. If the inner wall of a cylindrical bore is to be ground, the individual electrode sections are supplied with the same potential independently of one another with the same current path and the same frequency, the aggregate electrode performing oscillating movements in the direction of the cylinder axis. Application of different voltages to the individual electrodes and discontinuation of the oscillating movement in the direction of the longitudinal axis of the cylinder allows the production of areas having different surface finishes. In this instance it may be advantageous to rotate the electrode about its longitudinal axis.

Electrodes of the type shown may have any configuration desired apart from the pure cylindrical shape, as shown by the broken lines 16 in Fig. 2. They are suitable for grinding any surface, one line of the tool being in contact with the work at a time. Also in this instance, the machining time will be shorter than with the corresponding treatments so far employed since practically only a point contact between the tool and the work has been possible for the obtention of a certain surface finish.

The tool according to Fig. 2 is also suitable for producing semicylindrical recesses in surfaces. Naturally the voltage applied to the electrodes may be varied during the eroding process.

Figure 3:
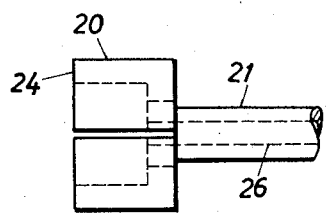
Figs. 3 and 4 are a side view and plan view respectively of a cylindrical electrode with segment-type electrode sections.
Figure 4:
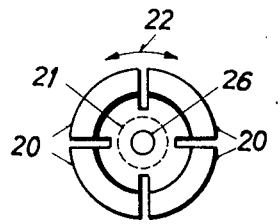

Figs. 3 and 4 are plan and side views respectively of an electrode which is also cylindrical but has its various electrode sections 20 designed as segments which are arranged parallel with the cylinder axis. With an oscillating or rotary movement about axis 21 in the direction of arrow 22, it is possible, as with the electrode disclosed above, to grind semicircular recesses and bores.

However, the electrode disclosed is particularly suited for surface grinding, similar to the cup-grinding wheel employed in the corresponding material detaching process. The voltages are preferably supplied via collecting rings as the electrode sections themselves are unsuitable for the supply owing to the danger of soiling. The front face 24 does not extend to the centre of the electrode so that the material particles removed may collect there. The shaft 21 may also be provided with a central bore 26 through which the electrolytic or dielectric liquid is supplied or removed by suction so that the area machined may be flushed more efficiently.

Figure 5:
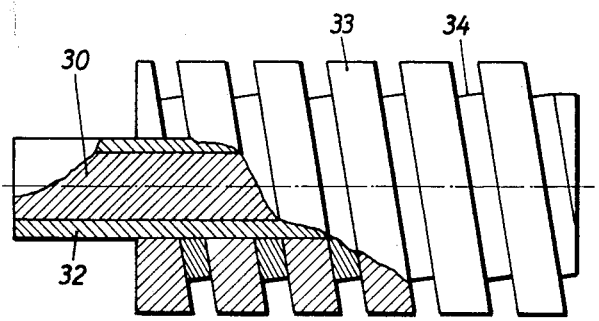
Fig. 5 shows a cylindrical electrode with annual electrode sections inclined with respect to the electrode axis.

The electrode shown in Fig. 5 is designed similar to that represented in Fig. 2; it comprises a metallic shaft 30 over which an insulating tube 32 is slipped. Arranged on the insulating tube 32 are the annular electrode sections 33 and insulating rings 4 having a smaller diameter between two adjacent electrode sections. All members are rigidly assembled by means of a screw (not shown) or by cementing. Each electrode ring is electrically connected to a collecting ring through which the operating voltage is supplied to the said electrode.

As previously stated, the current flowing through each individual electrode is individually limited so that a given maximum value in each electrode section 33 is not exceeded in the interests of a good surface finish. However, it is also possible—in a manner similar to that employed with the other rotary electrodes according to this invention—to incorporate the resistances limiting the maximum voltage in the various electrodes in the rotary body so that the voltage may be supplied to the electrodes by means of a single collecting ring to which the resistances are connected.

In contrast to the electrode shown in Fig. 1 the individual electrode rings 33 of Fig. 5 are arranged so as to be inclined towards the vertical plane or, in other words, with regard to the longitudinal axis of symmetry of the electrode unit so that each individual ring treats a larger area of the work than would correspond to its width. The arrangement is preferably so that each ring is inclined to an extent that, in one extreme position of the electrode unit, it covers the areas of the work which faces an adjacent intermediate ring 34 in the other extreme position of the tool. This arrangement enables a work surface tangentially located relative to the tool to be evenly treated in all areas without creating locally excessive currents which might damage the surface.

Although Fig. 5 shows a cylindrical surface, rotary electrodes of this type may be given, e.g. by turning, any configuration desired depending on the shape of the surface to be machined.

Figure 6:
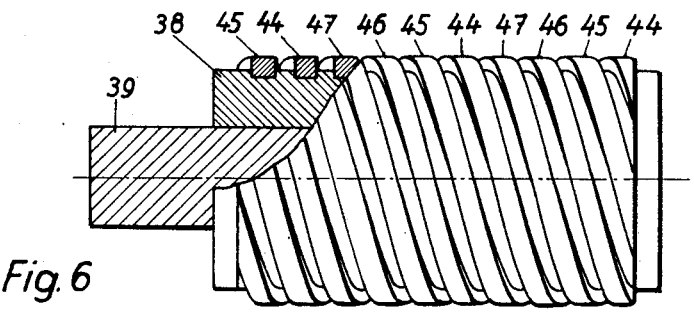
Fig. 6 shows a cylindrical electrode with helical electrode sections.

Fig. 6 shows a cylindrical electrode in which the individual electrode sections are helically arranged around an insulator. Arranged on shaft 39 is the insulating body 38 in which four helical grooves are provided. Inserted in these grooves are four band-type electrode sections 44, 45, 46 and 47 each connected to a collecting ring for the separate supply of voltage. This arrangement ensures not only that the surface of the work is given the desired finish while the density of the total current is relatively high, but that the electrode wears evenly.

Figure 7:
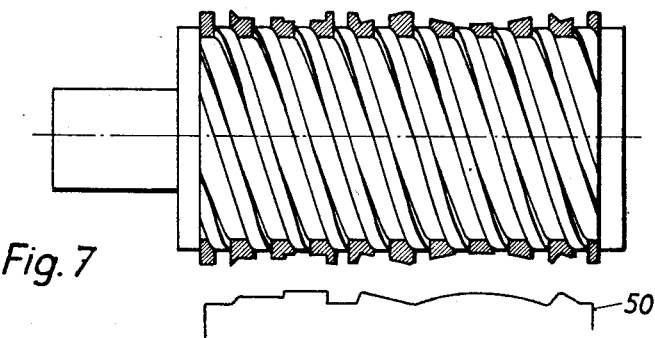
Fig. 7 shows the electrode according to Fig. 6 with a turned profile.

Fig. 7 shows an electroerosive grinding tool which substantially resembles the tool represented in Fig. 6 but has a surface contour deviating from the purely cylindrical shape. This is necessary to grind irregular surfaces, such as the surface shown at 50. The electrode shown in Fig. 7 may readily be formed by mechanical turning from an electrode such as shown in Fig. 6. Obviously, surfaces of practically any contour can be obtained.

Fig. 8 represents a conical electrode for the treatment of conical bores or surfaces. Arranged on a metallic shaft 65 is an insulating body 66 provided with four helical grooves which again accommodate four band-type electrode sections 67, 68, 69 and 70. Each of these electrode sections is again connected to a collecting ring for the purpose of electrical supply. If required, it is also possible to subdivide each individual electrode section once or several times so that eight or twelve individual current supply means must be provided.

Figures 11, 12:
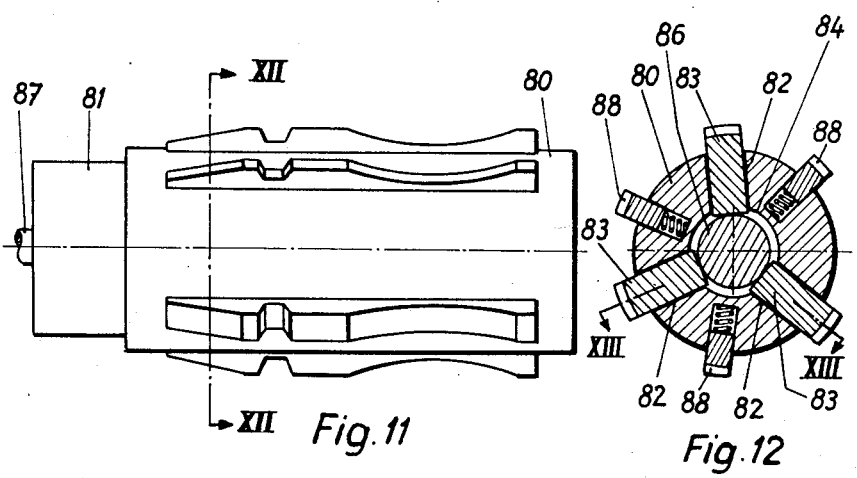
Figs. 11 through 13 show an electrode for grinding recessed profiled bores, Fig. 12 showing a section along line XII—XII in Fig. 11, and Fig. 13 a section along line XIII—XIII in Fig. 12.
Figure 13:
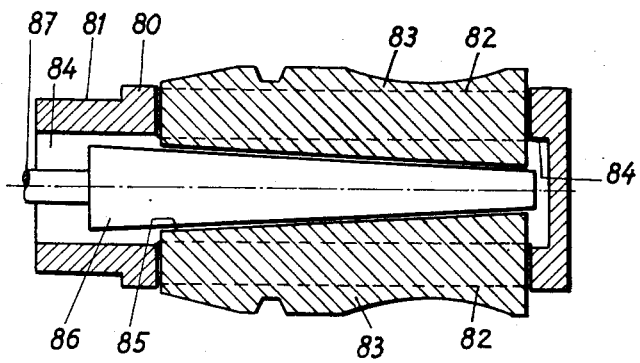

The electrodes shown in Figs. 9 through 13 are designed to grind cylindrical or profiled interior bores. They comprise an insulating carrier or body 80 with a projection 81 for insertion in a tool holder designed to rotate the electrode. The insulating body may be provided, by way of example, with three slots 82 extending in the axial direction to a central bore 84. These slots accommodate the electrode sections 83. The electrode sections have the edges that project from the slots formed with profiles corresponding to the profile of the bore which is to be ground by means of the aggregate electrode. The electrode shown in Figs. 9 and 10 is suitable, by way of example, to grind a cylindrical or slightly conical bore, while the electrode illustrated in Figs. 11 through 13 is designed for grinding a bore having a corresponding interior profile.

The individual electrode sections 83 have an inner surface inclined relative to the electrode axis, which engages a circular cone 86 formed for an insulating material 87. If the circular cone is forced into the electrode during operation by means of the shaft 87, the individual electrode sections 83 are pushed outwardly so that the necessary electrode feed is ensured also when material has been removed. The shaft 87 may be forced into the body by a continuous force as usual, by way of example by a mechanical spring; it is, however, also possible to control the feed depending on a parameter of the spark erosion process, as in conformity with the current flowing through the electrode unit.

Current is supplied to the individual electrode sections as by flexible leads (not shown) which are connected, on the one hand, to the respective electrode sections and, on the other, to collecting rings to which the required voltages are applied.

In addition to the electrodes, guide members 88 may be provided which are accommodated in grooves formed in the body 87 and may be forced radially outwardly as by spring pressure. These guides are preferably given the same profile as the electrode sections. They are designed particularly to hold the complete tool concentrically in the bore to be machined. It is possible to insert the guide members in the body so as to be insulated, and to apply a voltage to them.

The electrode shown in Figs. 14 and 15 is particularly suitable for machining larger surfaces and comprises a flexible electrically insulating band 90 and flexible metallic electrode sections 91 embedded in the insulating band. The voltage is preferably applied to the underside of the band 90, by sliding contacts (not shown) via contacts 94. The electrode band is passed along the surface to be treated in the longitudinal direction and forced against the work by pressure under a guide. If the surface is to be machined uniformly, the longitudinal motion is complemented by an oscillating transverse movement so that such areas may be subjected to electroerosive treatment as would otherwise face the insulating strips 93 between the electrode bands. The advantage of this arrangement resides mainly in the fact that surfaces curved in one direction may also be machined. The whole band is preferably substantially longer than the surface to be treated so that each individual band member is only briefly in contact with the work as compared to the total machining time. This substantially reduces electrode wear per unit length of the band. The electrode band may, by way of example, be wound alternately on one of two rollers which are spaced and between which the work is located. The band will then change its direction of travel—similar to a typewriter ribbon—when one roller is unwound, which then winds up the electrode band.

Similarly to the embodiments described above, the electrode here disclosed may simultaneously produce areas of different finish if the electrode sections receive different voltages.

The electrode shown in Figs. 16 and 17 is designed for the same purpose and similarly constructed as the electrode according to Figs. 14 and 15. The electrodes proper, however, are designed not as prismatic bands but as individual wires 96, groups of which are in electrical contact among one another.

Figs. 18 and 19 show an electrode 100 also formed of flexible, electrically insulating material in which a number of electrodes in the shape of prismatic bands 101 or of individual wires 102 are embedded. Against the two electrodes previously described, the individual electrode members are arranged transversely to the longitudinal direction of travel of the band. The voltage is also supplied by brushes or the like so that areas extending in the direction transverse to that of the travel of the band may receive different treatment.

Figure 20:
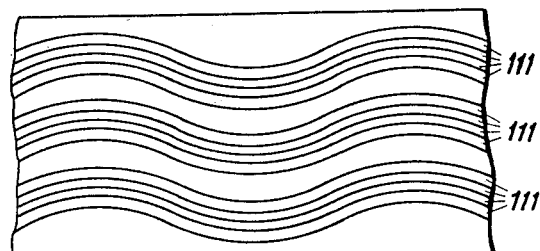
Fig. 20 shows an electrode band similar to that represented in Figs. 16 and 17 with wavy electrode sections.
Figure 21:
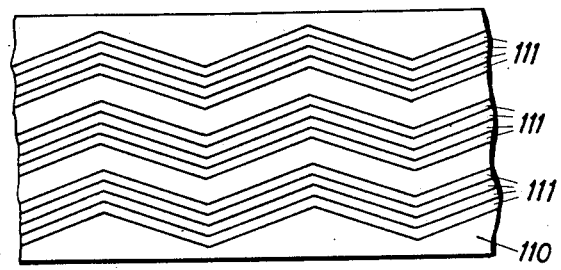
Fig. 21 shows an electrode band similar to that represented in Figs. 16 and 17 with zigzag electrode sections.

In the last-named case, each surface area is supplied by a particular lead so that a certain spot of the surface is treated by means of the voltage supplied by one lead. The band-type electrodes shown in Figs. 20 and 21 substantially correspond to those shown in Figs. 14 through 17. Embedded in a flexible, electrically insulating band 110 are groups of conductively interconnected wires, each group representing an electrode section. Against the band electrodes disclosed above, the wires of a group are not disposed parallel with the boundary lines of the band, but e.g. in waves (Fig. 20). This enables all portions of a surface over which the band passes to obtain even treatment without requiring a transverse movement of the band. In this case, too, the voltage supplied to each electrode section is limited so that excellent surface finishes can be obtained with a relatively high total current density.

Figure 22:
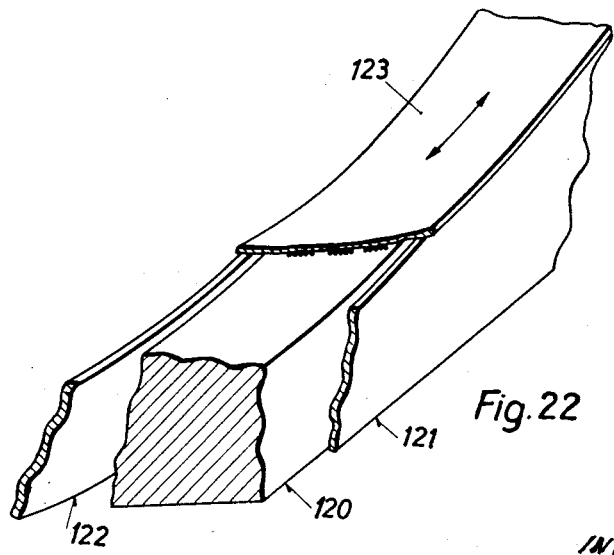
Fig. 22 shows a device for grinding by means of one of the electrode bands shown in Figs. 14 through 21.

Fig. 22 shows an arrangement for grinding a surface curved in one direction, as by one of the grinding bands shown in Figs. 14 through 21. The band 123 travels on two guide rails 121 and 122 which correspond to the profile of the surface of the work 120 to be polished. The band may be passed over the work continuously. The necessary contact pressure may be obtained pneumatically, by employing gravity or contact rollers. It is thus possible to produce a surface of practically any profile with sufficient accuracy.

The advantage of the method disclosed resides mainly in the fact that it enables a surface of practically any size to be erosively machined and ground in a relatively short space of time. Another advantage of the method consists in that various areas of the work surface may also be erosively treated in one and the same operation. Furthermore, the electroerosive grinding method reduces electrode wear to a minimum.

Having now particularly described and ascertained the nature of our said invention and in what manner the same is to be performed, we declare that what we claim is:

1. An electro-erosive electrode rotatable about its longitudinal axis, which comprises in combination: a core including a shaft for selective insertion into a tool holder, a plurality of electrode sections arranged in spaced relationship to each other and mounted on said core in insulated relationship thereto, and insulating means between said electrode sections to thereby allow the supply of current of different magnitudes to said sections respectively, said sections being inclined to the direction of movement of said electrode.

2. An electro-erosive electrode rotatable about its longitudinal axis, which comprises in combination: a core including a shaft for selective insertion into a tool holder, a plurality of electrode rings arranged in spaced relationship to each other and mounted on said core in insulated relationship thereto, and insulating means between said electrode rings to thereby allow the supply of current of different magnitudes to said rings respectively, said rings forming an acute angle with said longitudinal axis of said electrode.

3. An electro-erosive electrode rotatable about its longitudinal axis, which comprises in combination: a core including a shaft for selective insertion into a tool holder, a plurality of electrode rings arranged in spaced relationship to each other and mounted on said core in insulated relationship thereto, and insulating means between said electrode rings to thereby allow the supply of current of different magnitudes to said rings respectively, said rings forming an acute angle with said longitudinal axis of said electrode and having their outer effective surfaces designed to define a cylindrical surface coaxial with said longitudinal axis.

4. An electro-erosive electrode rotatable about its longitudinal axis, which comprises in combination: a core including a shaft for selective insertion into a tool holder, a plurality of electrode strips arranged in spaced relationship to each other and helically wound around said core in insulated relationship thereto so as to define oblique angles with said longitudinal axis, and insulating means between said electrode strips to thereby allow the supply of current of different magnitudes to said strips respectively.

5. An electro-erosive electrode rotatable about its longitudinal axis, which comprises in combination: a core including a shaft for selective insertion into a tool holder, a plurality of electrode strips arranged in spaced relationship to each other and helically wound around said core in insulated relationship thereto so as to define oblique angles with said longitudinal axis, and insulating means between said electrode strips to thereby allow the supply of current of different magnitudes to said strips respectively, the outer circumferential surfaces of said electrode strips defining a cylinder coaxial with said longitudinal axis.

6. An electro-erosive electrode rotatable about its longitudinal axis, which comprises in combination: a core including a shaft for selective insertion into a tool holder, a plurality of electrode strips arranged in spaced relationship to each other and helically wound around said core in insulated relationship thereto so as to define oblique angles with said longitudinal axis, and insulating means between said electrode strips to thereby allow the supply of current of different magnitudes to said strips respectively, the outer peripheral surface of said electrode strips being of different contours with regard to each other but coaxial with said longitudinal axis.

7. An electro-erosive electrode rotatable about its longitudinal axis, which comprises in combination: a core including a shaft for selective insertion into a tool holder, a plurality of electrode strips arranged in spaced relationship to each other and helically wound around said core in insulated relationship thereto so as to define oblique angles with said longitudinal axis, and insulating means between said electrode strips to thereby allow the supply of current of different magnitudes to said strips respectively, the outer circumferential surfaces of said electrode strips tapering toward one end of said electrode.

8. An electro-erosive electrode rotatable about its longitudinal axis, which comprises in combination: a core including a shaft for selective insertion into a tool holder, a plurality of electrode units arranged in spaced relationship to each other and mounted on said core in insulated relationship thereto, each of said electrode units comprising a plurality of adjacently arranged current conducting elements, and insulating means between said electrode units to thereby allow the supply of current of different magnitudes to said units respectively, said units forming oblique angles with said longitudinal axis.

9. An electro-erosive electrode rotatable about its longitudinal axis, which comprises in combination: a core including a shaft for selective insertion into a tool holder, a plurality of electrode sections arranged in spaced relationship to each other and mounted on said core in insulated relationship thereto, said electrode sections being movable in radial direction, means in said core and in engagement with the inner ends of said electrode sections and operable to move the latter radially outwardly, and insulating means between said electrode sections to thereby allow the supply of current of different magnitudes to said sections respectively, said electrode sections forming an angle with the direction of movement of said electrode.

10. An electro-erosive electrode rotatable about its longitudinal axis, which comprises in combination: a core including a shaft for selective insertion into a tool holder, a plurality of electrode sections arranged in spaced relationship to each other and mounted on said core in insulated relationship thereto, said electrode sections being movable in radial direction, means consisting of electrically insulating material and having a tapering surface in engagement with the inner surfaces of said electrode sections for moving the latter radially outwardly in response to said means moving in a certain direction relative to said core, and insulating means between said electrode sections to thereby allow the supply of current of different magnitudes to said sections respectively, said electrode sections forming an angle with the direction of movement of said electrode.

11. An electro-erosive electrode rotatable about its longitudinal axis, which comprises in combination: a core including a shaft for selective insertion into a tool holder, a plurality of electrode sections arranged in spaced relationship to each other and mounted on said core in insulated relationship thereto, said electrode sections being movable in radial direction, means in said core and in engagement with the inner ends of said electrode sections and operable to move the latter radially outwardly, insulating means between said electrode sections to thereby allow the supply of current of different magnitudes to said sections respectively, said electrode sections forming an angle with the direction of movement of said electrode, guiding means supported by said core and movable in radial direction thereto, and spring means interposed between said guiding means and said core and continuously urging said guiding means radially outwardly.

12. An electro-erosive electrode according to claim 11, in which the guiding means are provided at their outer ends with the same profile as said electrode sections.

References Cited in the file of this patent

UNITED STATES PATENTS

| | | |
|---|---|---|
| 1,519,063 | Schroeder | Dec. 9, 1924 |
| 1,548,691 | Thomson | Aug. 4, 1925 |
| 1,572,515 | Clawson | Feb. 9, 1926 |
| 1,695,302 | Thompson | Dec. 18, 1928 |
| 2,059,236 | Holslag | Nov. 3, 1936 |
| 2,075,121 | Lessmann | Mar. 30, 1937 |
| 2,125,172 | Kingel | July 26, 1938 |
| 2,194,909 | Moss et al. | Mar. 26, 1940 |
| 2,214,760 | Brown | Sept. 17, 1940 |
| 2,479,412 | Rutter | Aug. 16, 1949 |
| 2,778,924 | Hill | Jan. 22, 1957 |
| 2,794,110 | Griffith | May 28, 1957 |
| 2,802,929 | Fefer et al. | Aug. 13, 1957 |
| 2,818,490 | Dixon et al. | Dec. 31, 1957 |